United States Patent Office 3,255,276
Patented June 7, 1966

3,255,276
PROCESS FOR THE MANUFACTURE OF HYDROCARBONS MODIFIED WITH VINYL PHOSPHONIC ACID
Jakob Winter, Hofheim, Taunus, Fritz Rochlitz and Hans Dieter Stemmer, Bad Soden, Taunus, and Erich Schmidt, Schonberg, Taunus, Germany; Franz Rochlitz and Anneliese Rochlitz, née Paetsch, executors of the estate of said Fritz Rochlitz, deceased, assignors to Farbwerke Hoechst Aktiengesellschaft vormals Meister Lucius & Brüning, Frankfurt am Main, Germany, a corporation of Germany
No Drawing. Filed Apr. 11, 1962, Ser. No. 186,627
Claims priority, application Germany, Apr. 13, 1961, F 33,650
9 Claims. (Cl. 260—897)

The present invention relates to a process for the manufacture of hydrocarbons, preponderantly of high molecular weight, that have been modified with vinyl phosphonic acid.

It is known to modify macromolecular substances by reacting them with compounds of low molecular weight. In this case it is advantageous when the macromolecular substances contain functional groups that enter readily into addition- and condensation-reactions, or double bonds that are capable of entering into addition reactions or copolymerizations. Reactions of macromolecular substances with oxygen and ozone play a special role since, in many cases, these reactions take place already under normal atmospheric influence as aging processes but which are also used occasionally for a controlled modification. In these reactions, hydroperoxides or ozonides are formed which, by the intermediary of secondary reactions, lead to strongly modified products which generally have a reduced molecular weight.

Important substitution reactions are those that are carried out with halides and halide/sulfur dioxide mixtures.

Graft reactions with unsaturated compounds which, in most cases, are capable of self-polymerization are carried out very frequently. Generally the process is carried out such that mixtures of the macromolecular substance to be modified with monomers are exposed to the action of radicals which are formed either after the addition of, for example, peroxides, redox systems, azo compounds or which are formed solely by the supply of heat, due to the action of irradiation rich in energy, or as the consequence of shearing forces attacking the macromolecular substance, i.e., in a mechanical-chemical manner. In the course of these reactions there are formed grafts on the macromolecular substance that had been placed in the polymerization vessel from a nascent new polymer, which grafts have different lengths (seldom the length of a single monomer unit). Macromolecular hydrocarbons play a special role for reactions of this kind, above all for the reasons that they are easily accessible and are produced, as is well known, for example synthetically in large quantities by the polymerization of olefins. By means of the methods described hydrocarbons have already been modified in various cases and new substances been obtained that possess modified properties.

High-molecular hydrocarbons which contain phosphorus in the form of incorporated phosphonic acids are of special interest. Thus it is known to react phosphorus trichloride in the presence of oxygen with polyethylene, in which reaction phosphonic acid groups are forming on the polymer in a small yield. As main product, however, there is formed phosphorus oxychloride which substantially impairs the polymer. Moreover, the latter is degraded in a high degree in reactions of this kind.

Now we have found that hydrocarbons containing phosphonic acid groups can be obtained by reacting hydrocarbons with vinyl phosphonic acid and/or vinyl phosphonic acid halides and/or the semi-esters of vinyl phosphonic acid in the presence of radical-forming substances.

The compounds of vinyl phosphonic acid used according to the invention correspond to the general formula

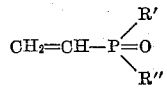

in which R' represents OH and Cl, Br, I, and wherein R" represents OH, Cl, Br, I and OR'", and wherein R" represents a hydrocarbon radical containing 1 to 8 carbon atoms, for example the methyl-, ethyl-, n-propyl, isopropyl and cyclohexyl group.

The production of the vinyl phosphonic acid compounds is carried out according to the process of German Patent No. 1,023,033.

In comparison with the products obtained by known processes the products according to the invention often have a higher molecular weight than the starting products and have an appreciably better color. Moreover the advantage is gained that by using the free vinyl phosphonic acid the undesired formation of hydrogen chloride and, especially, of phosphorus oxychloride is entirely avoided. It is very important, moreover, that the incorporation of the phosphonic acid groups can be controlled much more easily, that the expenditure for apparatus is reduced and that the compounds participating in the reaction can be measured exactly. Finally it is possible according to the process of the invention to incorporate a much higher quantity of phosphorus into the hydrocarbons.

The invention is directed both to pronouncedly high molecular hydrocarbons having molecular weights higher than 50,000 and to low molecular hydrocarbons having a wax-like or, occasionally, liquid consistency, said hydrocarbons being either primarily obtained as such or by degradation processes.

Insofar as solid products are used, the reactions are suitably carried out in solution, but they may also be carried out with hydrocarbons which are suspended, for example emusified in water, which are softened by heating or by corresponding additives, which are in the molten state or which have been swollen to a small degree by means of solvents. The reactions may take place especially easily with hydrocarbons that are rubber-elastic, for example on the roller, in the case of low molecular hydrocarbons advantageously in substance without any addition.

The amount of vinyl phosphonic acid that is reacted with hydrocarbons according to the process of the invention may be within the range of from >0 to about 400% by weight, calculated on the hydrocarbon used.

In as much as the conversions take place in solutions, it is suitable to use solvents which are as inert as possible or which only enter into slightly radical or ionic reaction with the reactants. Especially suitable are carbon tetrachloride, tetrachlorethylene, benzene, chlorobenzene. There may, on principle, also be used liquid aliphatic hydrocarbons as solvents which may then also participate in the reaction, although to a lesser extent. It is possible to choose as methods that bring about the formation of radicals those methods that are usually applied in graft reactions, i.e., above all by the addition of radical-forming peroxides and azo compounds or by the application of irradiation rich in energy. The natural or synthetic hydrocarbons to be modified according to the process of the invention (there may also be used mixtures of these hydrocarbons) may be saturated or unsaturated. There may also be used those hydrocarbons that still contain periodically or statistically, functional groups or heteroatoms as obtained, for example, by the copolymerization of olefins with other monomers or by the subsequent reaction of hydrocarbons with correspondingly reactive compounds. There are mentioned, for example:

Polyethylene, especially polyethylene that has been obtained according to the Ziegler process (cf. Raff-Allison "Polyethylene," Interscience Publishers, Inc., New York, 1956, page 72 et seq.), or polyethylene wax, polypropylene, polybutene-1, copolymers of ethylene with propylene, the molar ratio of which may vary between 0.1:99.9 and 99.9:0.1, and higher α-olefins having up to 12 carbon atoms which have been obtained according to the Ziegler process, preferably those having the character of an elastomer, polystyrene, natural rubber, hydrogenized natural rubber, balata, gutta-percha, polyisoprene, polybutadiene, copolymers of butadiene with styrene or acrylontrile, polychloroprene, chlorinated or chlorosulfonated polymers of ethylene and α-olefins or the copolymers thereof with one another.

Insofar as the reactions take place in solution and are initiated with radical-forming systems, the process is suitably carried out such that the vinyl phosphonic acid and the activator are added to the hydrocarbon solution and the mixture is heated to a temperature at which the degradation of the activator takes place within a favorable period of time. This temperature is dependent on the degradation tendency of the activators, which tendency may vary in degree, and generally ranges from room temperature (about 20° C.) to 200° C. When using benzoyl peroxide the operation is suitably carried out within the range of from 70° to 90° C. The conversions may also take place in stages by adding first only the activator or only the vinyl phosphonic acid or the halides thereof, or by adding the activator and the vinyl phosphonic acid in portions at intervals.

As radical-forming substances for carrying out the process according to the invention there may be used organic peroxides such as, for example, benzoyl-peroxide,
di-tertiary-butyl-peroxide,
dicumyl-peroxide,
acetyl-peroxide,
caprylyl-peroxide,
lauryl-peroxide,
p-chlorobenzoyl-peroxide,
2,4-di-chlorobenzoyl-peroxide,
di-isopropyl-percarbonate,
tertiary-butyl-hydroperoxide,
p-menthane-hydroperoxide,
pinane-hydroperoxide,
cumyl-hydroperoxide,
tertiary-butyl-peroxy-acetate,
tertiary-butyl-peroxyisobutyrate,
tertiary-butyl-peroxy-benzoate,
di-tertiary-butyl-di-peroxy-phthalate,
cyclo-hexanone-peroxide as well as azo compounds which degrade with the formation of radicals such as, for example, azo-diisobutyronitrile. The reaction time amounts up to 48 hours.

It is advantageous to protect the reaction mixture from the admission of oxygen or air to a large extent since otherwise there might occur autoxidation reactions and the substances to be modified might be subjected to a strong oxidative degradation. It is therefore, suitable to use inert gases for scavenging, such as nitrogen and carbon dioxide, or to carry out the operation in closed vessels, if necessary in vacuo.

It is not necessary in all cases to process the substances modified with vinyl phosphonic acid, but it is in general advisable to do so. It is in many cases advantageous to carry out a steam treatment, above all in reactions to be effected in solution while the solvent distills off. Suspensions can in most cases be simply filtered off. The methods of extraction and recrystallization are likewise applicable in many cases, the methods of dissolution and precipitation being carried out, if necessary, in fractions. The processing possibilities have not been exhausted by the above citation but depend on the reaction methods, on the type of the hydrocarbons used (in most cases high molecular weight hydrocarbons), on the extent to which the vinyl phosphonic acid is incorporated, and on the conditions prevailing in each case. They correspond to generally known methods.

Nothing definite can as yet be said about the mechanism of the reactions taking place according to the invention. Although an extensive radical graft reaction by the vinyl group can be assumed with certainty, there must also be taken into consideration that bonds are produced by the intermediary of the acid groups. Finally there may also take place ionic addition reactions of the vinyl group.

The amount of the phosphorus incorporated in the form of phosphonic acid may vary very much according to the requirements in each individual case and may amount, for example, to 20%; in most cases, however, it will be situated within the range of 0.5% to 10%.

To the products according to the invention there may be added, as usual, age resistors such as antioxidants, antiozonants and light stabilizers. Said products are, furthermore, capable of entering into further reactions. Rubber-elastic products that have been modified according to the invention can be crosslinked advantageously with metal oxides, for example, zinc oxide, magnesium oxide, etc., or with suitable diamines with the addition of active or inactive fillers and organic saturated acids. The phosphonic acids which are chemically bound to the hydrocarbons furthermore bring about an improved adhesion to metals and textiles on the one hand, and with respect to dyestuffs and inks on the other hand. In many cases they are also capable of imparting a better transparency, for example to polyethylene. In the case of a high phosphorus content the hydrocarbons modified in this manner exhibit self-extinguishing properties after ignition in a hot flame and removal from the latter.

The following examples serve to illustrate the invention but they are not intended to limit it thereto, the parts being by weight:

*Example 1*

100 parts of a copolymer of ethylene and propylene having a reduced specific viscosity of 2.7 and a propylene content of 34 mol percent were dissolved in 1900 parts of chlorobenzene. 20 parts of vinyl phosphonic acid, 40 parts of water and 1 part of benzoyl peroxide were added to this solution which was maintained for 5 hours under an atmosphere of nitrogen at 80° C., with agitation, then the solution was subjected to a steam distillation whereby the solvent distilled off and the rubber-elastic copolymer remained behind. The latter was removed and dried in vacuo at 50° C. A phosphorus content of 1.7% by weight was found on elementary analysis.

*Example 2*

As described in Example 1, 100 parts of a copolymer of ethylene and propylene having a reduced specific viscosity of 3.0 and a propylene content of 36 mol percent were dissolved in 1900 parts of chlorobenzene. 20 parts of vinyl phosphonic acid and 1 part of benzoyl peroxide were added to this solution which was heated at 80° C. for six hours, with agitation, while a light current of nitrogen continuously passed over the solution. Then the solution was subjected to a steam distillation. The rubber-elastic copolymer was removed and dried in vacuo at 50° C. A phosphorus content of 2.8% by weight was found upon elementary analysis. After the admixture of 50 parts of high abrasion furnace black, 7 parts of zinc oxide and 3 parts of stearic acid, the mixture was kept in the press at 150° C. for 40 minutes whereby a good vulcanizate was obtained.

*Example 3*

100 parts of the same copolymer of ethylene and propylene, as described in Example 2, were dissolved in 1900 parts of chlorobenzene. 10 parts of vinyl phosphonic acid dichloride and 1 part of benzoyl peroxide were added and the solution was stirred for 7 hours under nitrogen at 80° C. Then the solution was treated with steam until the solvent was removed. The rubber was dried in vacuo and contained 1.0% of phosphorus and less than 0.3% of chlorine.

*Example 4*

2 parts of vinyl phosphonic acid and 0.34 part of azodiisobutyro-nitrile were added to 200 parts of a 5% solution of a prechlorinated copolymer of ethylene and propylene, and the solution was stirred for 6 hours under nitrogen at 90° C. Then the solution was poured into 1 l. of acetone with precipitation of the rubber. After drying this rubber contained 1.3% of phosphorus.

*Example 5*

40 grams of polyethylene were suspended in 400 cc. of a high-boiling petroleum ether (boiling point 80° to 100° C.) and heated with the addition of 0.8 gram of benzoyl peroxide and 0.8 gram of azo-diisobutyro-nitrile for 1 hour at 90° C. water bath temperature. Then 40 grams of vinyl phosphonic acid dichloride were added and the reaction mixture was heated for 6 hours under reflux. After cooling to room temperature, the residue was filtered off with suction, boiled several times with water and dried in the vacuum drier at 60° C. 43 grams of a phosphorated polyethylene were obtained which had a phosphorus content of 1.4%. After distilling the petroleum ether from the filtrate, the unreacted vinyl phosphonic acid dichloride could be recovered.

*Example 6*

40 grams of polyethylene were suspended in 400 cc. of gasoline (boiling point 100° to 140° C.) and heated with the addition of 1.6 grams of benzoyl peroxide and 1.6 grams of azo-diisobutyro-nitrile for one hour at 90° to 95° C. water bath temperature. Then 40 grams of vinyl phosphonic acid dichloride, dissolved in 100 cc. gasoline, were added dropwise and the reaction mixture was heated for 6 hours at 85° C. to 90° C. water bath temperature. After cooling to room temperature the residue was filtered off with suction and boiled several times with water. After drying the residue in the vacuum drier at 100° C., there were obtained 46 grams of a phosphorated polyethylene having a phosphorus content of 3.8%.

*Example 7*

40 grams of polystyrene were dissolved in 200 cc. of toluene and, after the addition of 0.8 gram of benzoyl peroxide and 0.8 gram of azo-diisobutyro-nitrile, heated for one hour at 80° to 85° C. Then 40 grams of vinyl phosphonic acid dichloride were added and the reaction mixture was heated for 5½ hours at 85° to 90° C. Then the whole was cooled to room temperature, filtered off with suction and the residue was boiled several times with water. 37 grams of a phosphorated polystyrene were obtained that had a phosphorous content of 2.8%.

*Example 8*

200 parts of a copolymer of ethylene and propylene, 600 parts of vinyl phosphonic acid, 2 parts of benzoyl peroxide and 4000 parts of chlorobenzene were heated together to 80° C. The solution was stirred at this temperature for 6 hours under a current of nitrogen, then treated with steam while the chlorobenzene distilled off. After drying there remained behind a solid, almost white product with a phosphorus content of 17%. When held in the hot flame of a Bunsen burner the product hardly burned and was extinguished at once when removed from the flame. The product only showed slight changes.

We claim:

1. A process for the manufacture of a hydrocarbon containing phosphonic acid groups, which comprises reacting a hydrocarbon selected from the group consisting of polyethylene, polypropylene, polybutene-1, copolymers of ethylene with α-olefins having up to 12 carbon atoms, polystyrene, natural rubber, hydrogenized natural rubber, polyisoprene, polybutadiene, a copolymer of butadiene with styrene, a copolymer of butadiene with acrylonitrile, a polychloroprene, a chlorinated polymer of ethylene, a chlorosulfonated polymer of ethylene, a chlorinated polymer of an α-olefin, a chlorosulfonated polymer of an α-olefin and chlorinated and chlorosulfonated copolymers of ethylene and α-olefins, with at least one member selected from the group consisting of vinyl phosphonic acid, a halide of vinyl phosphonic acid and a semi-ester of vinyl phosphonic acid in the presence of a radical-forming compound.

2. A process for the manufacture of a hydrocarbon containing phosphonic acid groups, which comprises reacting a hydrocarbon selected from the group consisting of polyethylene, polypropylene, polybutene-1, copolymers of ethylene with α-olefins having up to 12 carbon atoms, polystyrene, natural rubber, hydrogenized natural rubber, polyisoprene, polybutadiene, a copolymer of butadiene with styrene, a copolymer of butadiene with acrylonitrile, a polychloroprene, a chlorinated polymer of ethylene, a chlorosulfonated polymer of ethylene, a chlorinated polymer of an α-olefin, a chlorosulfonated polymer of an α-olefin, and chlorinated and chlorosulfonated copolymers of ethylene and α-olefins, with a compound of the general formula

wherein R' is a member selected from the group consisting of —OH, —Cl, —Br, —I, R" is a member selected from the group consisting of —OH, —Cl, —Br, —I and —OR''', wherein R''' represents a radical of a hydrocarbon having 1 to 8 carbon atoms, in the presence of at least one member selected from the group consisting of a radical-forming peroxide and a radical-forming azo compound.

3. The process of claim 1, wherein the reaction is carried out in an inert solvent.

4. The process of claim 1, wherein the reaction is carried out with the exclusion of oxygen.

5. The process of claim 2, wherein the concentration of the compound having the formula

amounts to up to 400 percent by weight, calculated on the hydrocarbon, and the concentration of the radical-forming compound amounts to up to 15 percent by weight, calculated on the hydrocarbon.

6. The process of claim 1 wherein the temperature during the reaction is within the range of about 20° C. to about 200° C.

7. The process of claim 1, wherein the reaction is carried out in an inert solvent selected from the group consisting of carbon tetrachloride, tetrachlorethylene, benzene and chlorobenzene.

8. The process of claim 1 wherein the hydrocarbon has a molecular weight of at least 50,000.

9. The process of claim 1 wherein the hydrocarbon is an elastomer copolymer of ethylene and propylene.

References Cited by the Examiner

UNITED STATES PATENTS

| | | | |
|---|---|---|---|
| 2,854,434 | 9/1958 | Beaman | 260—85.5 |
| 2,888,434 | 5/1959 | Shashoua | 260—85.5 |
| 3,043,821 | 7/1962 | Coover et al. | 260—80 |

FOREIGN PATENTS 1,023,033   1/1958   Germany.

MURRAY TILLMAN, *Primary Examiner.*

JAMES A. SEIDLECK, *Examiner.*

N. W. SHUST, J. WHITE, *Assistant Examiners.*